March 10, 1942. T. FRASER 2,275,849
APPARATUS FOR SEPARATING MIXED MATERIALS
Filed Aug. 24, 1936 3 Sheets-Sheet 3

Inventor
Thomas Fraser
By Ogle R. Singleton
Attorney

Patented Mar. 10, 1942

2,275,849

UNITED STATES PATENT OFFICE 2,275,849

APPARATUS FOR SEPARATING MIXED MATERIALS

Thomas Fraser, Aurora, Ill.

Application August 24, 1936, Serial No. 97,716

3 Claims. (Cl. 209—466)

My invention consists in a new and useful improvement in apparatus for separating mixed materials, and is designed more particularly for the treatment of fine, dry particulate materials, separating the particles according to specific gravity, concentrating the heavier particles and the lighter particles into separate products, of my apparatus.

Figure 1:
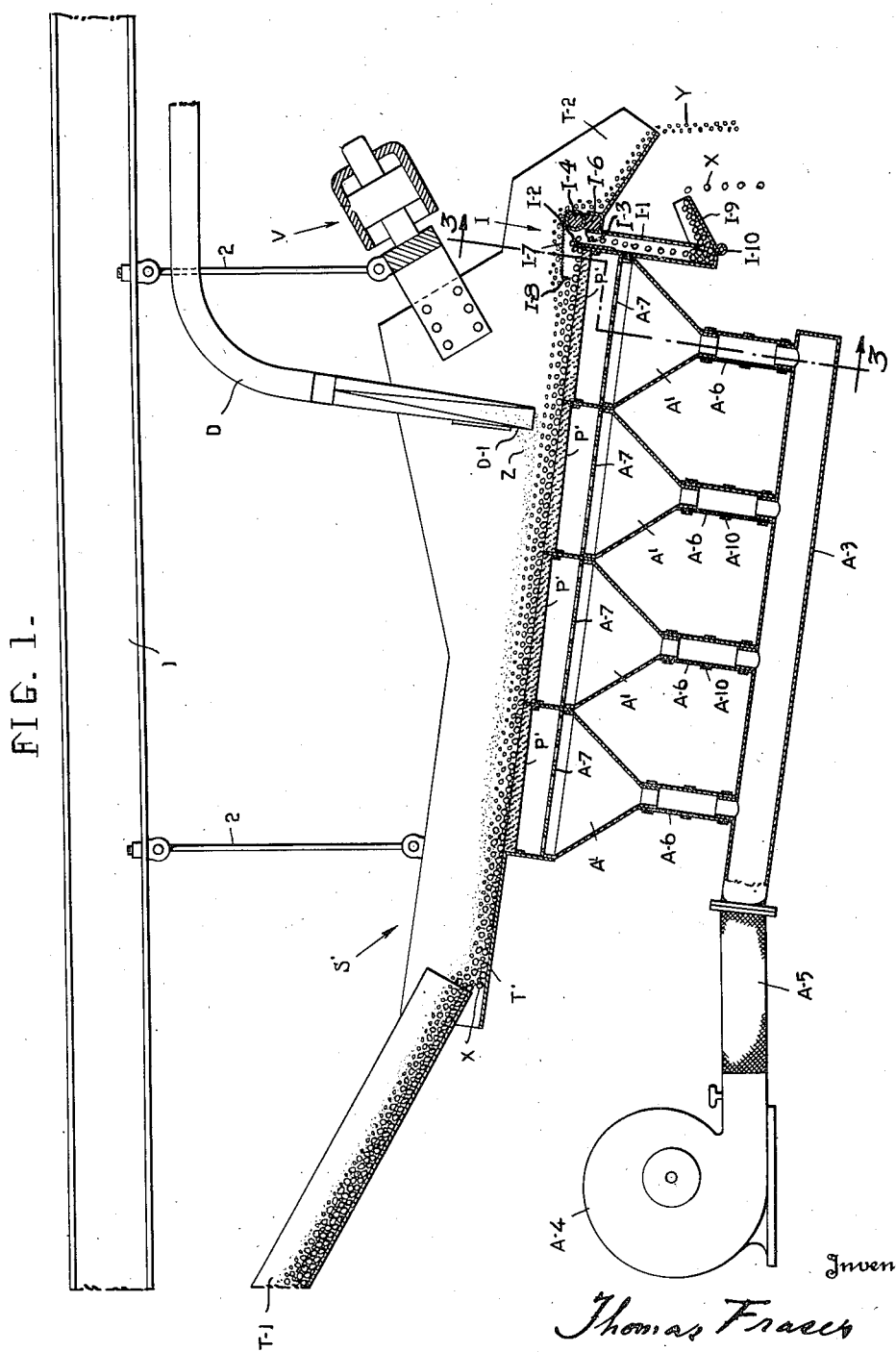
Fig. 1 is a longitudinal vertical section of my device.
Figure 2:
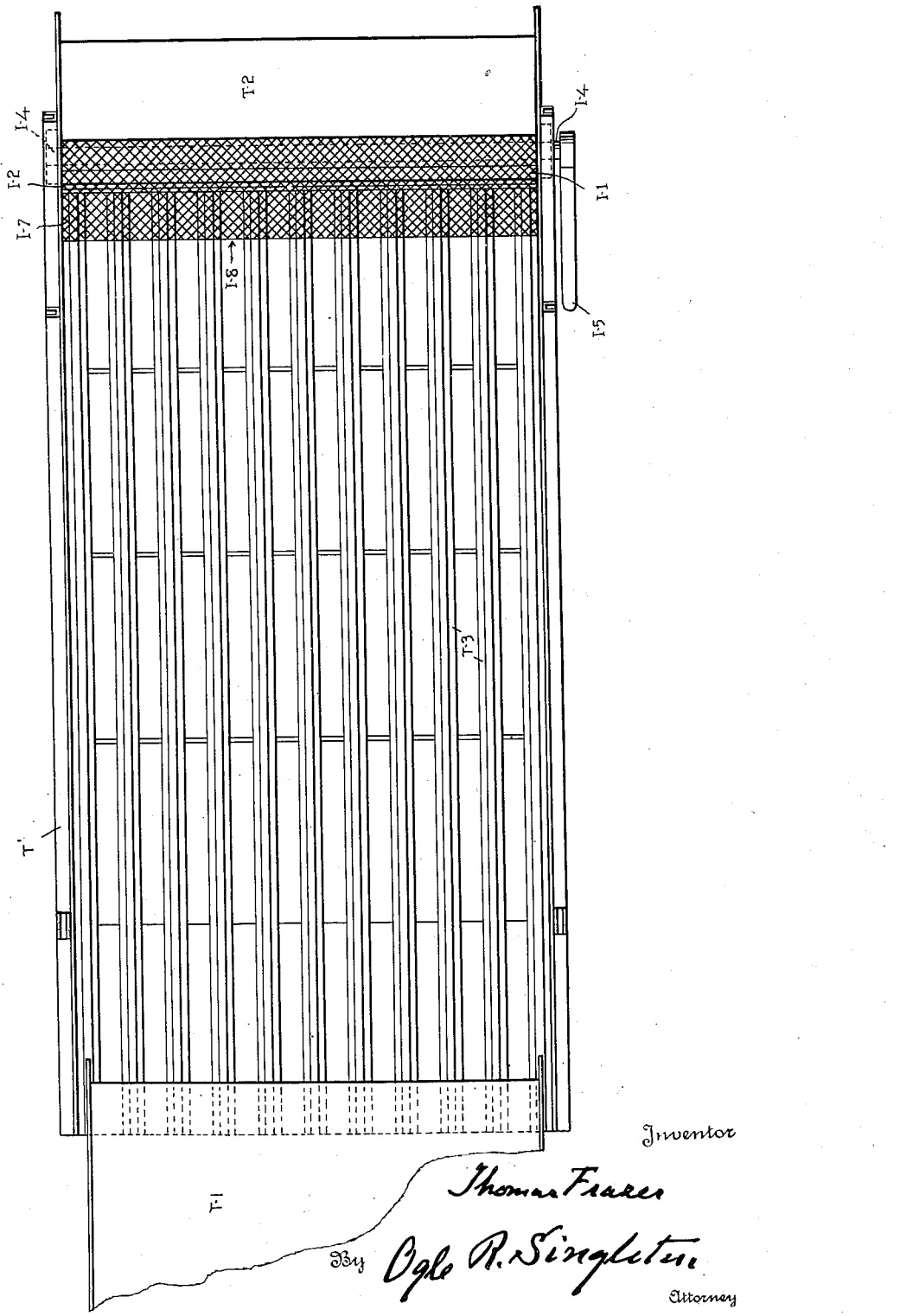
Fig. 2 is an enlarged plan view of the separator chamber of the device.

The device, illustrated in the drawings, is pivotally suspended from a fixed supporting member 1 by any suitable means, such as hanger rods 2. Vibration may be applied to the separator chamber by any suitable means, and I have found by experience that excellent results can be produced by the use of a standard electric vibrator unit V illustrated diagrammatically in Fig. 1, suitably attached to the separator chamber.

In the device illustrated in the drawings the separator chamber S' comprises the trough T', and a series of air chambers A' each having an air-permeable plate P' at its top, the plates P' forming the bottom of the trough T'. I provide a supply chute T—I to introduce the mixed materials into the separator chamber S' which is slightly inclined downwardly from its rear end at which the chute T—I is disposed.

Figure 3:
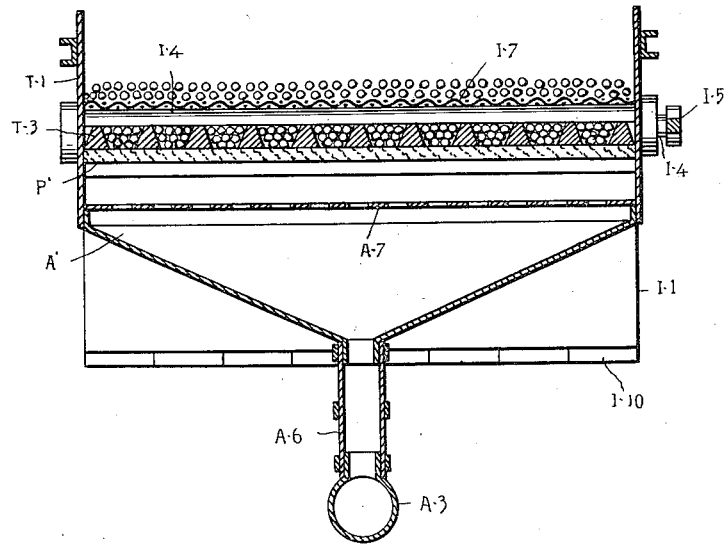
Fig. 3 is a transverse vertical section on the line 3—3 of Fig. 1, enlarged to correspond to Fig. 2.
Figure 4:
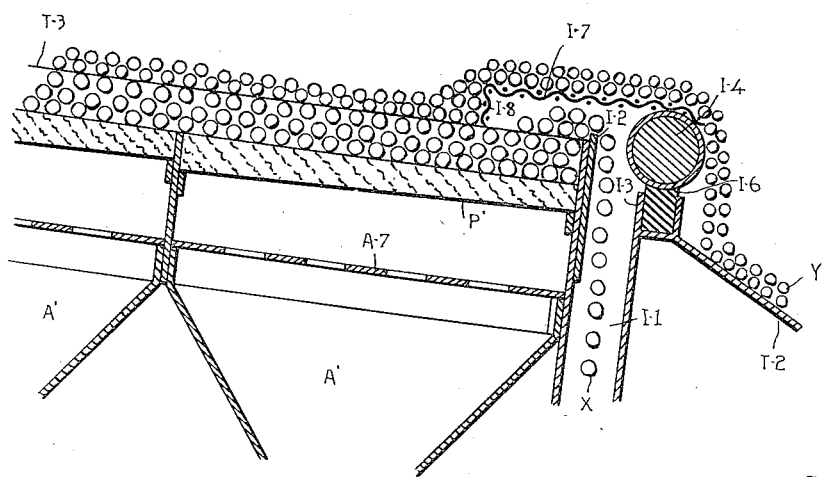
Fig. 4 is an enlarged detail, illustrating the discharge mechanism of the device.

I provide a discharge gate I at the front end of the trough T' consisting of a discharge spout I—I opening downwardly from the front end of the trough T'. The rear top edge I—2 of this spout I—I (Figs. 1 and 4) projects upwardly somewhat above the plane of the top of the plate P' adjacent thereto. Directly above the top front edge I—3 of the spout I—I there is suitably journaled in the sides of the trough T' a rock shaft I—4 with operating lever I—5. I provide a gasket I—6, of any suitable material such as rubber, disposed between the rock shaft I—4 and the top edge I—3 of the spout I—I. Suitably mounted upon the rock shaft I—4 is the air-pervious skim plate I—7 with the downwardly turned lip I—8 spanning the trough T'. Disposed forwardly of this plate I—7, there is the discharge chute T—2 for the trough T'. The spout I—I is provided at its bottom with an upwardly turned pivoted lip I—9 with rock shaft I—10 for adjusting the lip I—9. In the bottom of the trough T', upon the plates P' there are parallelly disposed longitudinal cleats T—3 designed trapezoidal in cross-section (Fig. 3).

Air is supplied to the air chambers A' through the inlet conduit A—3 from the controlled blower A—4 through the flexible conduit A—5, the inlet conduit A—3 being connected with each of the air chambers A' by a flexible conduit A—6. In each of the air chambers A', there is provided a suitable air-pervious plate A—7 suitably spaced below the plate P' designed to evenly distribute the air supplied through the pipes A—6.

Suitably mounted above the trough T' is the de-duster D having its suction nozzle D—I disposed within the trough T' and movable longitudinally thereof.

As illustrated in Fig. 1, the heavy material X flows out through the spout I—I, the light material Y through the discharge spout T—2, and the dust Z is drawn out through the de-duster D.

Having described the details of construction of my improved apparatus, I will now describe the operation.

In operating my device, the mixed materials are fed continuously by the supply chute T—I to the separator chamber S', maintaining a continuous flow of the materials through the chamber. The chamber S' is vibrated by the electric vibrator V, and air is forced upwardly through the plates P' from the air chambers A', the rate of air flow being regulated by the control of the air blower A—4. The mass of materials X, Y and Z flowing through the separator chamber S' is maintained in a fluid condition by the combination of air rising uniformly through the bed and the vibration imparted by the vibrator V. Under this condition, the coarsest particles X collect in a stratum on the plates P', and the finer particles Y and Z collect in strata at the top. The uppermost stratum Z may be drawn off through the nozzle D—I of the de-duster D, which is directed in such a manner as to draw the uppermost layer of fine dust Z into and through the de-duster D. The amount and maximum size of this product Z may be regulated by the velocity of the air current in the de-duster D, and by raising or lowering the nozzle D—I so as to change the proximity of the nozzle D—I to the bed of the materials being treated. The residual bed of materials X and Y passes this nozzle D—I, and is separated at the discharge end of the separator chamber S', the upper stratum Y being discharged by passing over the properly adjusted skim plate I—7, to discharge through the chute T—2, and the lower stratum X passing under the lip I—8 of the skim plate I—7 and over the top edge I—2 of the spout I—l, and be discharged through the spout I—l. The seal made by the gasket I—6 and the material X retained in the bottom of the spout I—l by the lip I—9 prevents air from separator chamber S' being passed out through the discharge spout I—l. Discharge of material X from the spout I—l, over the lip I—9, is brought about by the conveying action induced by the directional vibration of the separator chamber S' and spout I—l. Hence the rate of delivery over the lip I—9 may be regulated by a combination of the proper intensity of vibration and the inclination of the adjustable lip I—9.

Having described my invention, what I claim is:

1. Apparatus for classifying granular material including an inclined trough having a pervious bottom; means for feeding the material to the upper portion thereof; means for passing air upwardly through the bottom and the material thereon; means to vibrate the trough with a downwardly feeding action to cause the material to flow down the trough in a stream of generally uniform depth; a downwardly depending gate spaced from the bottom and against which the stream flows; a pervious skimming plate carrying the upper portion of the stream beyond the gate and spaced above the bottom; a dam beyond the gate and under the skimming plate, extending upwardly from the bottom high enough beyond the bottom of the gate to prevent the level of the heaviest stratum from getting below the bottom of the gate under the combined influence of the vibration of the trough and the fluid pressure of the stream; and means for restraining the escape of air from between the bottom and the skimming plate except by passing through the skimming plate, while forming a passage for the withdrawal of the heavier stratum passing below the gate, including a spout extending downwardly from said passage and a chute pivoted on the lower end of the spout and positioned to maintain the bottom of the spout filled to restrict the flow of air therethrough.

2. Apparatus for classifying granular material including an inclined trough having a pervious bottom; means for feeding the material to the upper portion thereof; means for passing air upwardly through the bottom and the material thereon; means to vibrate the trough with a downwardly feeding action to cause the material to flow down the trough in a stream of generally uniform depth; a downwardly depending gate spaced from the bottom and against which the stream flows; a pervious skimming plate carrying the upper portion of the stream beyond the gate and spaced from the bottom; a dam beyond the gate and under the skimming plate, extending upwardly from the bottom high enough beyond the bottom of the gate to prevent the level of the heaviest stratum from getting below the bottom of the gate under the combined influence of the vibration of the trough and the fluid pressure of the stream; and means for restraining the escape of air from between the bottom and the skimming plate except by passing through the skimming plate, while forming a passage for the withdrawal of the heavier stratum passing below the gate.

3. Apparatus for classifying granular material including an inclined trough having a pervious bottom; means for feeding the material to the upper portion thereof; means for passing air upwardly through the bottom and the material thereon; means to vibrate the trough with a downwardly feeding action to cause the material to flow down the trough; a downwardly depending gate spaced from the bottom and against which the stream flows; a pervious skimming plate carrying the upper portion of the stream beyond the gate and spaced above the bottom; a dam beyond the gate and under the skimming plate, extending upwardly from the bottom high enough beyond the bottom of the gate to prevent the level of the heaviest stratum from getting below the bottom of the gate under the combined influence of the vibration of the trough and the fluid pressure of the stream; and means for restricting the escape of air from between the bottom and the skimming plate except by passing through the skimming plate, while forming a passage for the withdrawal of the heavier stratum passing below the gate, including a spout extending downwardly from said passage, and means adjacent the spout to maintain the bottom of the spout filled, to restrict the flow of air therethrough.

THOMAS FRASER.